(12) United States Patent
Flowerday et al.

(10) Patent No.: US 6,435,587 B1
(45) Date of Patent: Aug. 20, 2002

(54) CONSOLE

(75) Inventors: Craig D. Flowerday, Holland; David J. Spykerman, Zeeland; Leif A. Norland, Holland; Brett W. Kooistra, Grand Haven, all of MI (US)

(73) Assignee: Johnson Controls Technology Company, Plymouth, MI (US)

( * ) Notice: Subject to any disclaimer, the term of this patent is extended or adjusted under 35 U.S.C. 154(b) by 48 days.

(21) Appl. No.: 09/755,287

(22) Filed: Jan. 5, 2001

(51) Int. Cl.$^7$ .................................................. B60N 3/00
(52) U.S. Cl. ..................... 296/37.8; 224/539; 220/345.5
(58) Field of Search .............................. 296/37.8, 37.5, 296/37.6, 33.14, 37.16; 224/539, 400; 220/345.1, 345.5

(56) References Cited

U.S. PATENT DOCUMENTS

| | | |
|---|---|---|
| 5,085,481 A | 2/1992 | Fluharty et al. |
| 5,338,081 A | 8/1994 | Young et al. |
| 5,397,160 A * | 3/1995 | Landry ....................... 296/37.8 |

* cited by examiner

*Primary Examiner*—Joseph D. Pape
(74) *Attorney, Agent, or Firm*—Price, Heneveld, Cooper, Dewitt & Litton

(57) ABSTRACT

A console includes a housing with a central storage area selectively enclosed by first and second sliding tray assemblies which move between a closed position adjacent one another to an open position distal from one another for gaining access to the central storage area. The console may include a removable storage bag which can be fitted under the sliding trays and removed from the console for carrying to a remote location. The sliding tray assemblies include storage systems, such as a storage/trash bin, cup holders, and the like and include a positive latching system to prevent inadvertent movement of the trays.

28 Claims, 7 Drawing Sheets

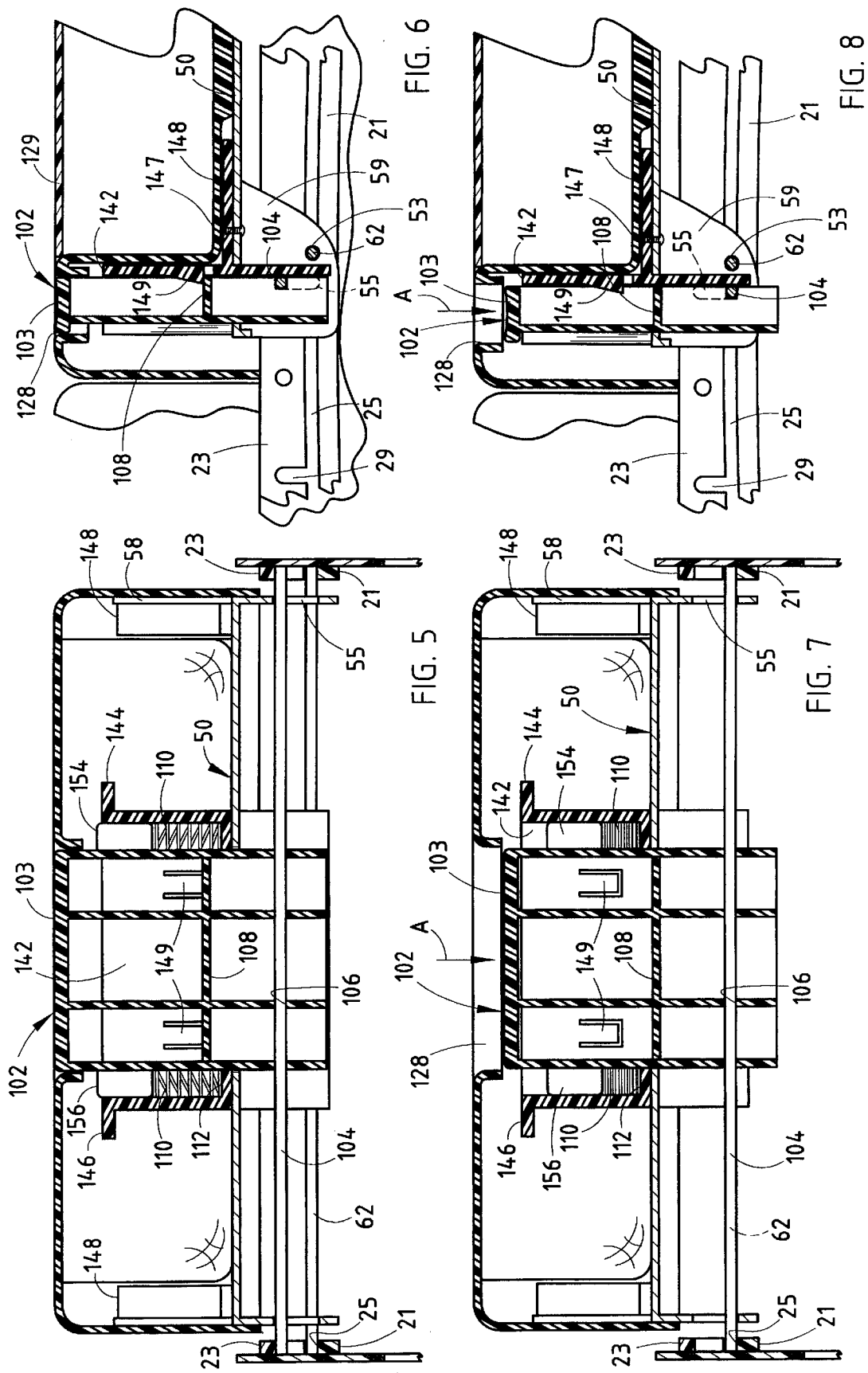

CONSOLE

BACKGROUND OF THE INVENTION

The present invention relates to a vehicle console and particularly one which has movable and removable storage units.

Many vehicles include storage consoles for the convenience of the vehicle operator and/or passengers. Vehicles, such as minivans, sport utility vehicles, and automobiles, typically have bucket seats with space therebetween for allowing the convenient mounting of such consoles. Consoles typically include cup holders, compartments, storage trays, and the like for use by vehicle occupants. Some consoles, such as disclosed in U.S. Pat, Nos. 5,338,081 and 5,085,481, include a variety of such features and may be removable from the vehicle floor itself. The console of the present invention provides improved features allowing for additional flexibility in the storage of items as well as providing removable storage, and the console itself can be removably mounted to a vehicle floor.

SUMMARY OF THE INVENTION

Consoles embodying the present invention include a housing which defines a central storage area which is selectively enclosed by first and second sliding covers which move between a closed position adjacent one another to an open position distal from one another for gaining access to the central storage area. In one embodiment of the invention, the console includes a removable storage container which can be fitted under the sliding covers and removed from the console and vehicle for carrying to a remote location. In other embodiments of the invention, the sliding covers include storage systems, such as a tray, a storage/trash bin, cup holders, and the like. The sliding covers include a positive latch to prevent their inadvertent movement.

In one preferred embodiment of the invention, sliding trays are pivotally coupled to pivoted end walls of the console housing and include guide rods captively held within guide tracks formed in the housing for controlling the movement of the sliding trays. A spring-loaded latch is provided for both trays, which allow the trays to be releasably latched for movement between positions selected by passengers or the vehicle operator in front of or behind the console. In a preferred embodiment of the invention also, the console housing is removably mounted to a vehicle floor utilizing a latch assembly so that the entire console can be removed from the vehicle if desired.

These and other features, objects and advantages of the present invention will become apparent upon reading the following description thereof together with reference to the accompanying drawings.

BRIEF DESCRIPTION OF THE DRAWINGS

FIG. 5 is an enlarged cross-sectional view, taken along section lines V—V of FIG. 1, of one of the tray latch assemblies, shown in a latched position;

FIG. 6 is a fragmentary enlarged cross-sectional view, taken along section lines VI—VI of FIG. 1, of the latch assembly shown in FIG. 5, shown in the latched position;

FIG. 7 is a cross-sectional view of the structure as shown in FIG. 5, shown with the latch in a depressed unlatched position; and FIG. 8 is a fragmentary cross-sectional view of the latch mechanism as shown in FIG. 6, shown in an unlatched position.

DETAILED DESCRIPTION OF THE PREFERRED EMBODIMENT

Figure 1:
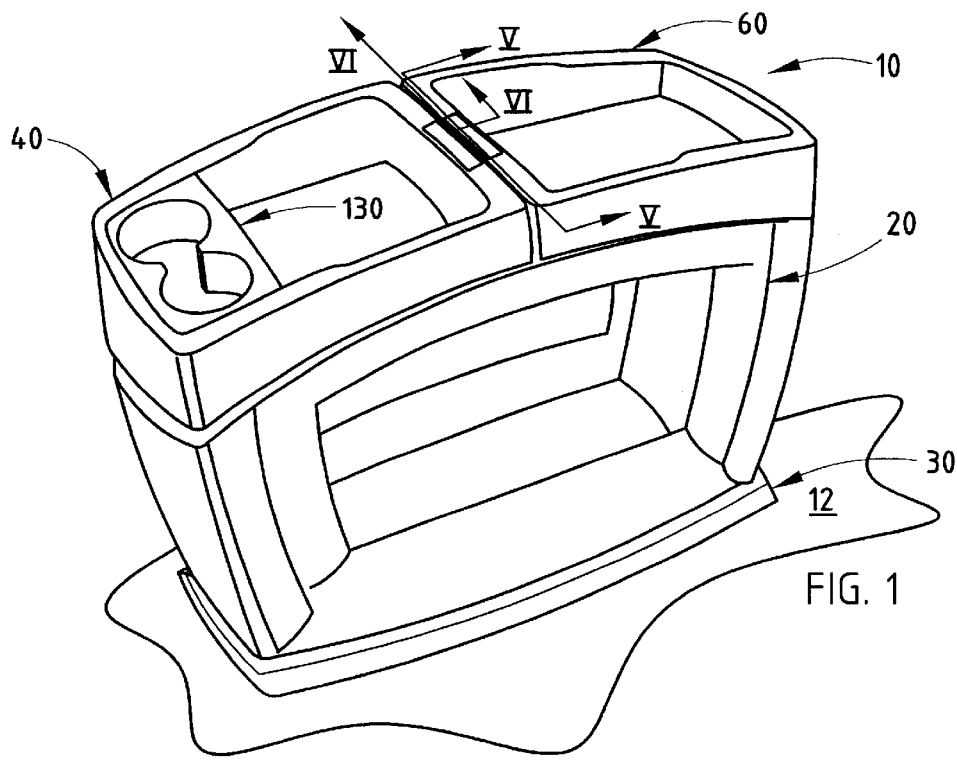
FIG. 1 is a perspective view of a console embodying the present invention, shown with the tray assemblies in a first or closed position.
Figure 2:
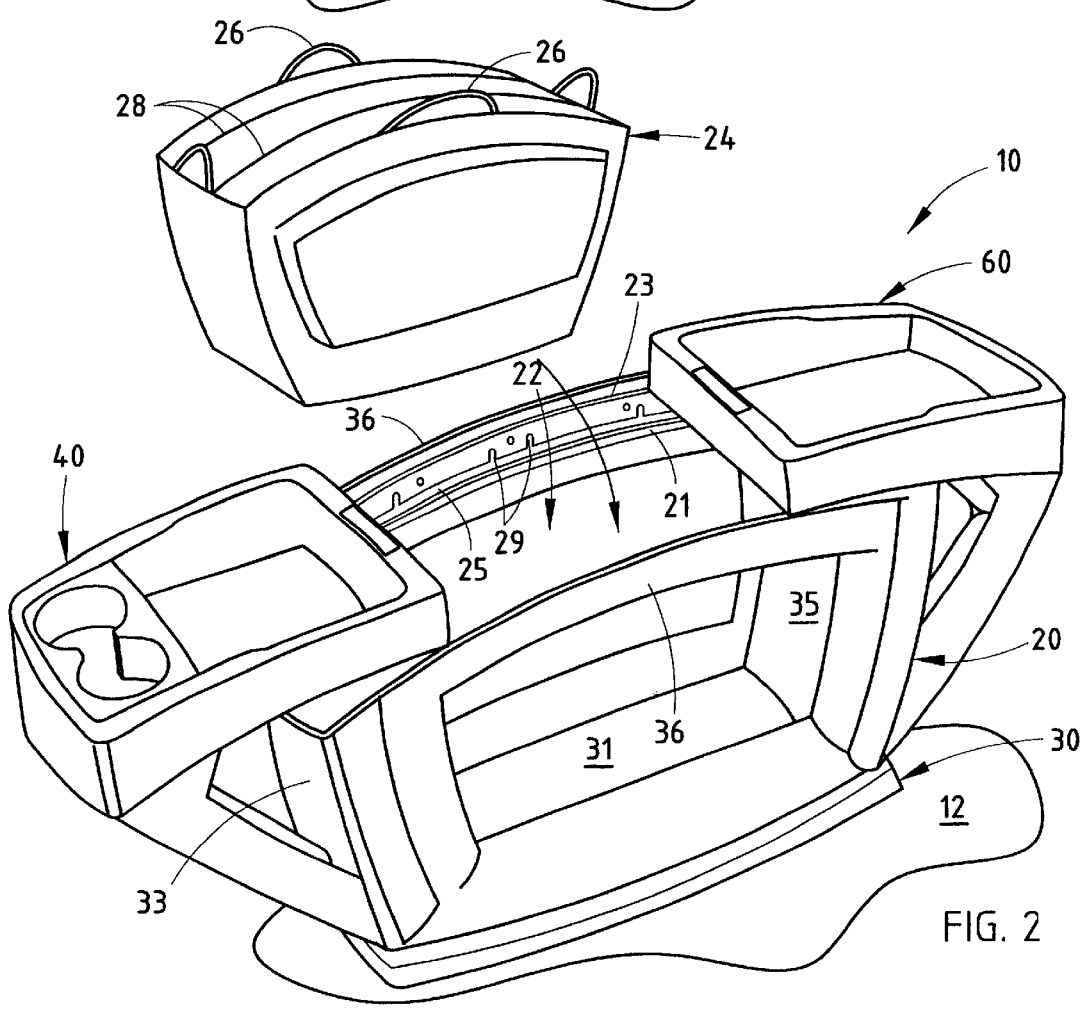
FIG. 2 is a perspective view of the console shown in FIG. 1, showing the trays in their open position and a removable container shown positioned above the console.
Figure 3A:
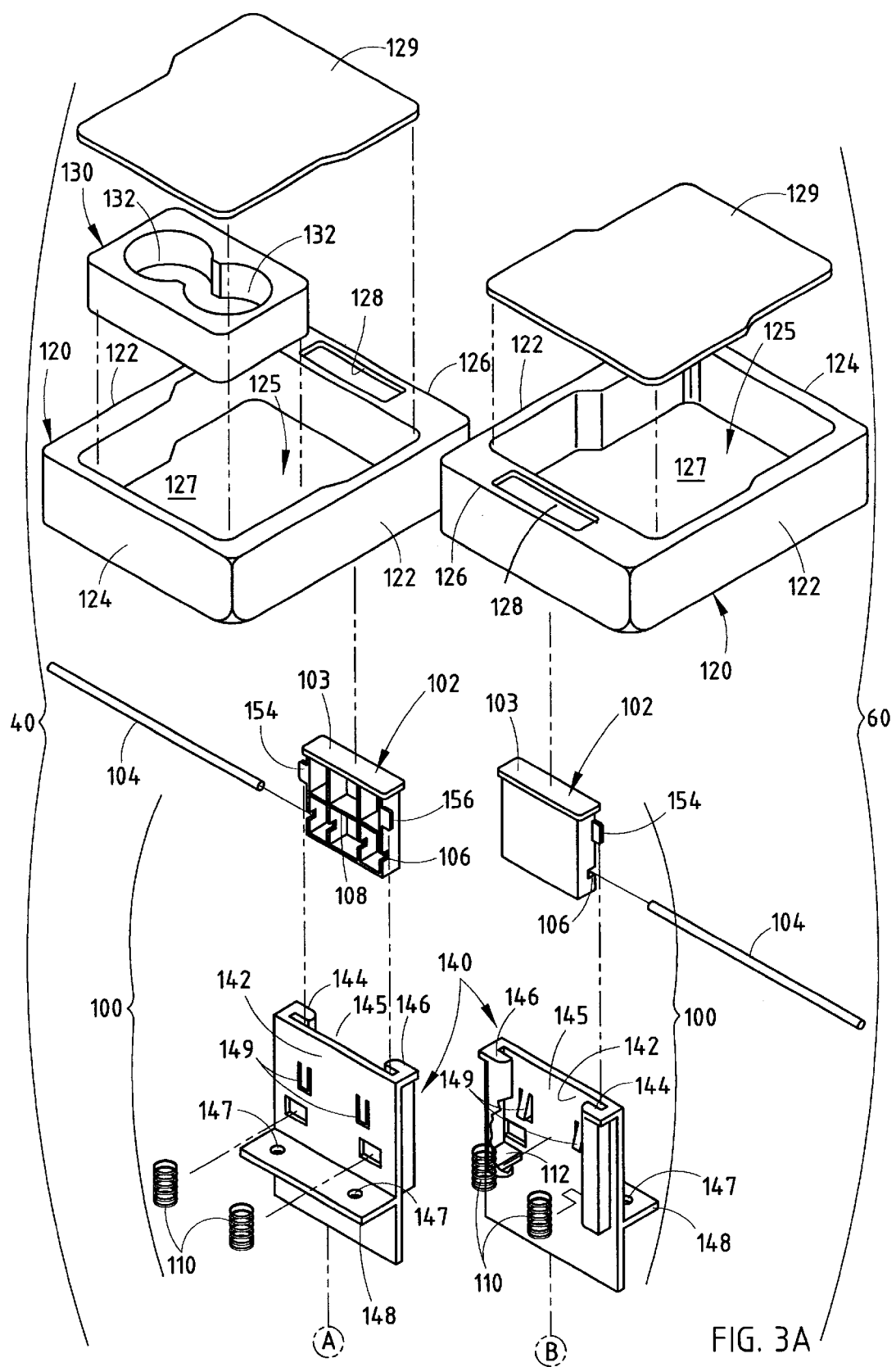
FIGS. 3A–3D is an exploded perspective view of the components of the console shown in FIGS. 1 and 2, shown divided into sheets 3A–3D from top to bottom.
Figure 3B:
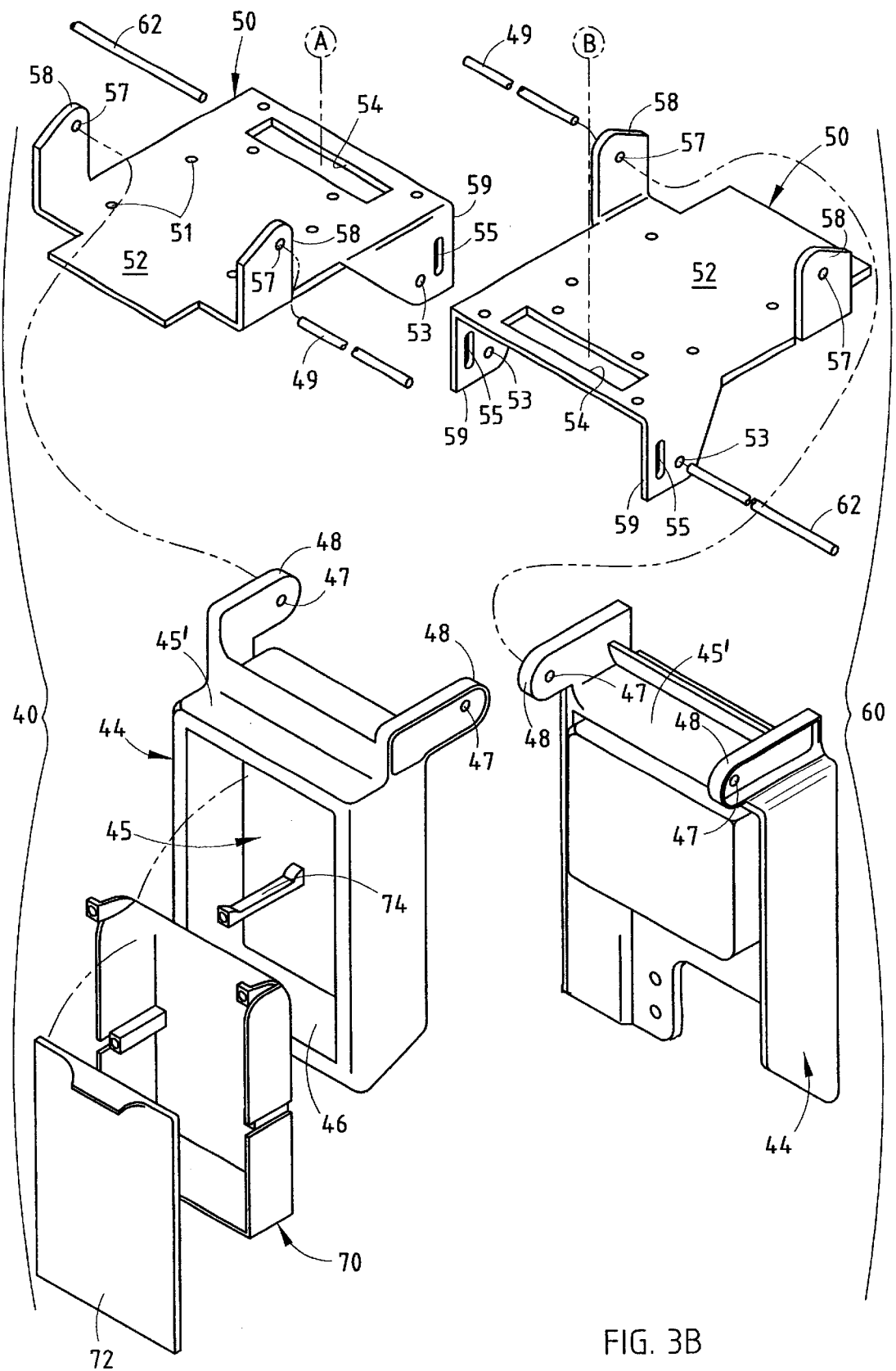
Figure 3D:
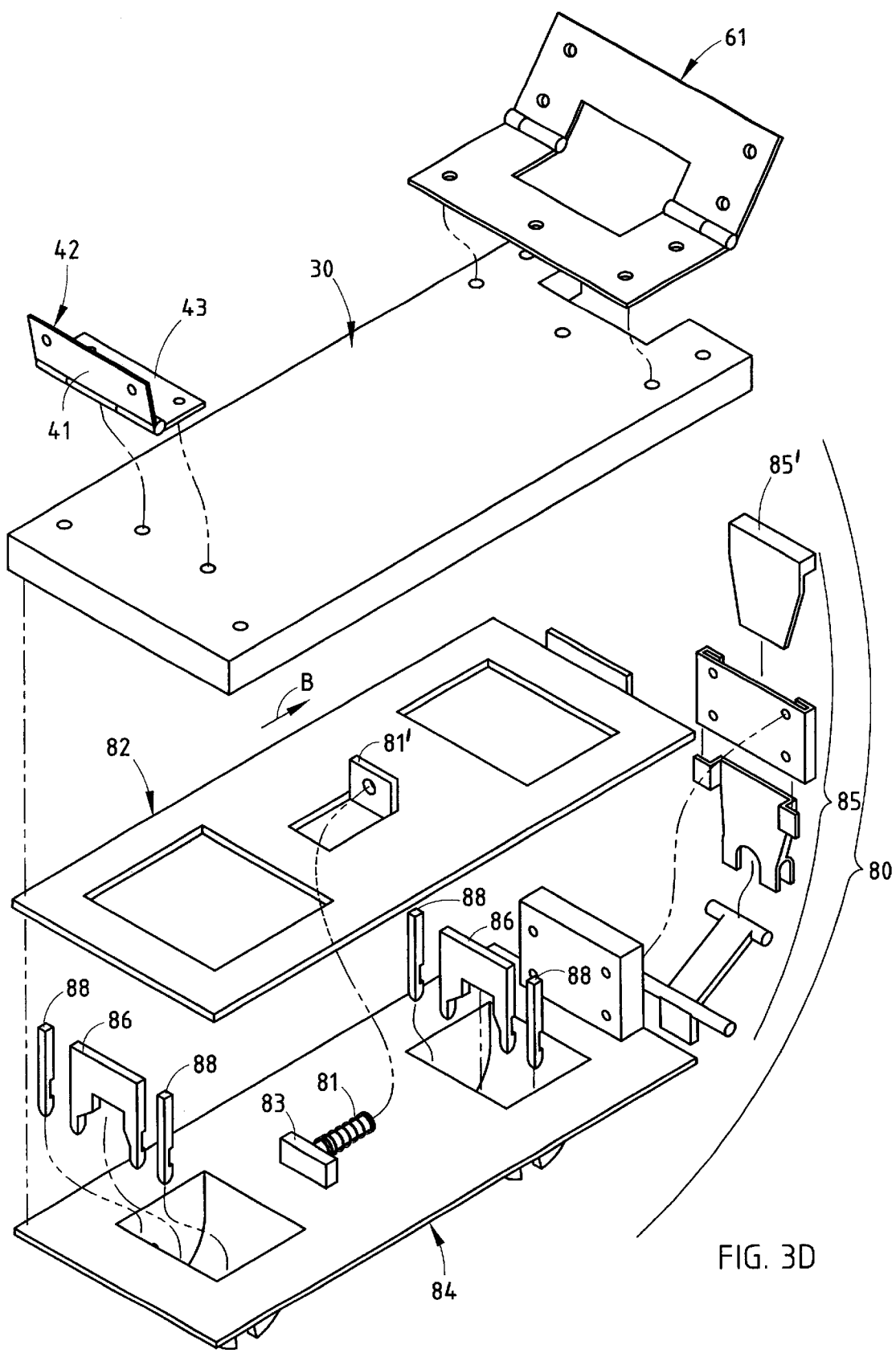
Figure 4:
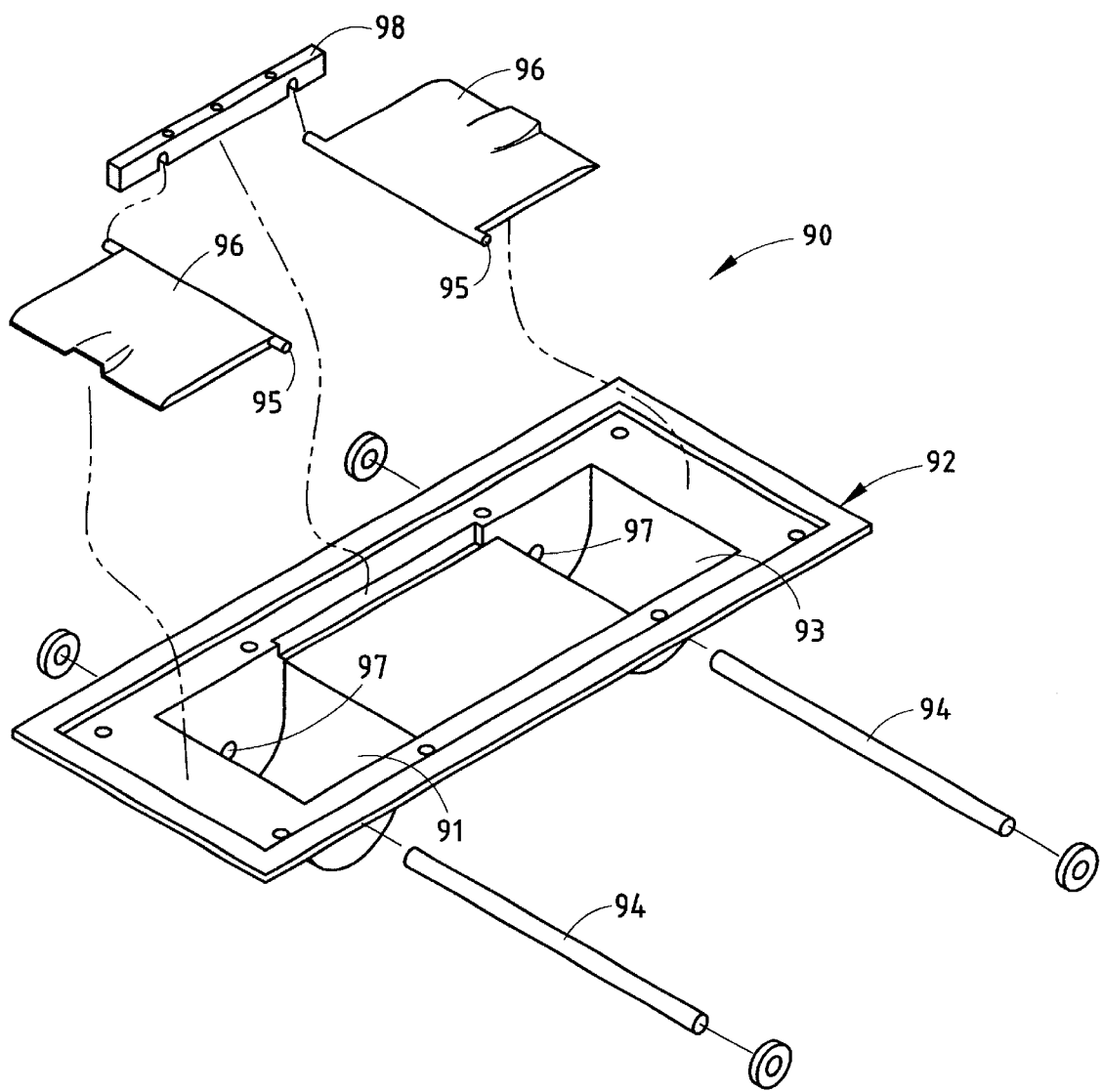
FIG. 4 is an exploded perspective view of the latch assembly for mounting to the vehicle floor for receiving the console of FIGS. 1–3.

Referring initially to FIGS. 1 and 2, there is shown a console 10 embodying the present invention, which is removably mounted to the floor 12 of a vehicle, such as a minivan, automobile, sport utility vehicle or the like. Console 10 includes a central housing 20 which defines a support for a front sliding tray assembly 40 and a rear sliding tray assembly 60, each of which are movable as seen in FIGS. 1 and 2, from a closed position shown in FIG. 1 in which the tray assemblies are substantially adjacent and contacting one another to an expanded open position as seen in FIG. 2. The tray assemblies 40, 60 define covers for a central storage compartment 22 of console housing 20 which receives a removable wire frame nylon storage container 24. Container 24 includes handles 26 and storage pockets opened with zippers or other fasteners 28 for providing a removable storage container 24 which integrally fits within console housing 20. In one embodiment, housing 20 is mounted to a base 30 which, in turn, is secured to a latch assembly 80 (FIG. 3D) which removably mounts the housing 20 to a mating socket assembly 90 (FIG. 4) to releasably secure the console 10 to the floor 12 of a vehicle. The latch assembly 80 and socket assembly 90 may be of a construction disclosed in greater detail in U.S. patent application entitled MEDIA PLAYER SYSTEM FOR A VEHICLE, filed on Dec, 28, 1998, Ser. No. 09/222,261, the disclosure of which is incorporated herein by reference, although a brief description of the assembly follows after a description of the console 10.

Figure 3C:
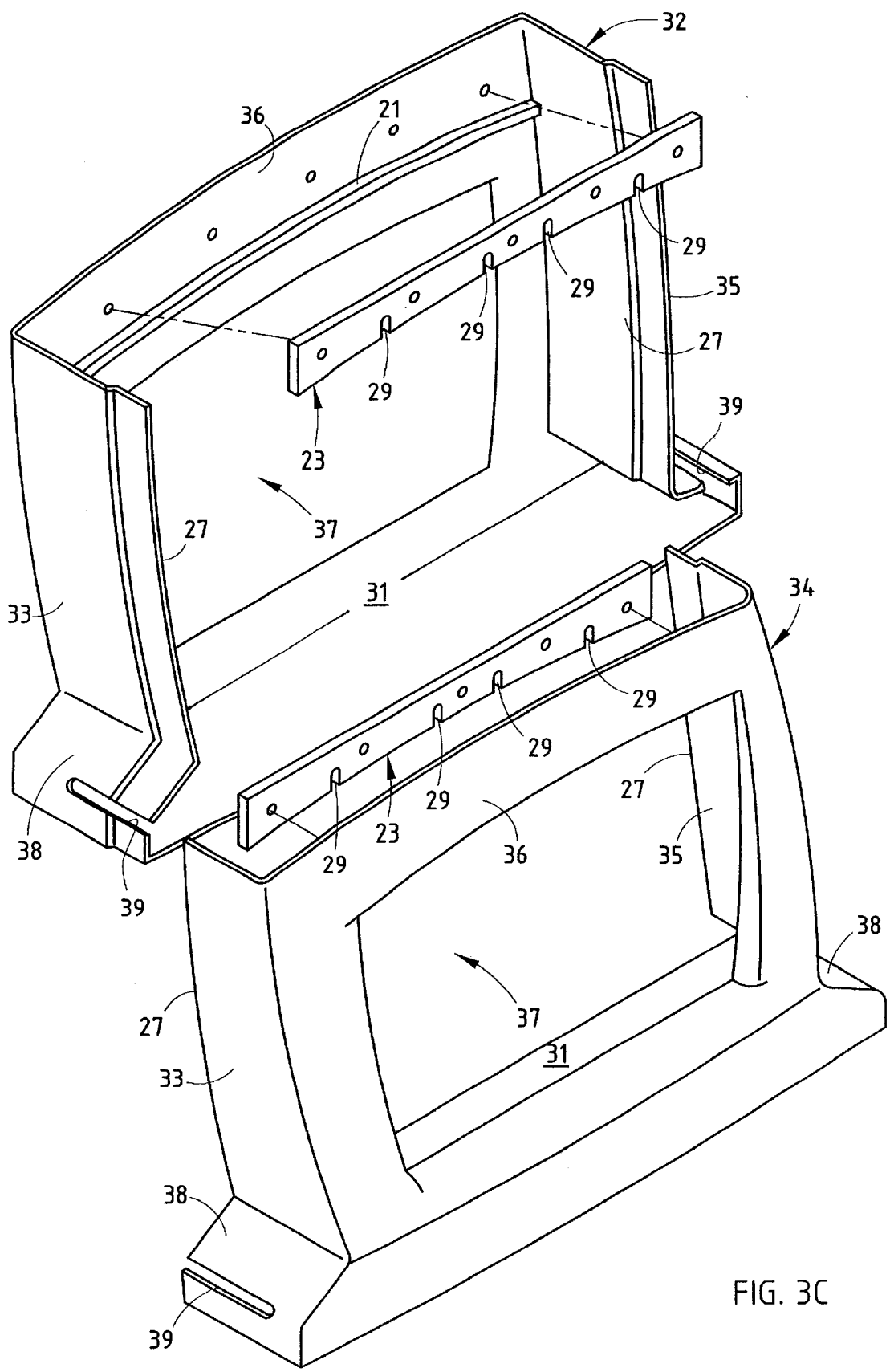

As best seen in FIG. 3C, housing 20 includes a first integral side member 32 and a second integrally molded side member 34, both of which are made of a suitable polymeric material, such as ABS, or the like. Sides 32 and 34 define halves of the housing and integrally include a floor 31, which is secured to base 30 (FIG. 3D) by suitable fastening screws (not shown). Sides 32 and 34 also each include a front wall 33 and a rear wall 35 interconnected by a top wall 36. Each member 32 and 34 thereby define an open framework having a central opening 37 which can be selectively enclosed by removable panels, if desired, although the open framework provides access to the central storage area 22 from the sides if desired.

A guide track 25 is provided on each of the interfacing top walls 36 of the housing 20 and is defined by a lower rail 21 and an upper rail 23, which is mounted in spaced relationship to lower rail 21, as best seen in FIGS. 5–8, for receiving guide rods 62 and latching bars 104 as described in greater detail below. The substantially symmetrical housing halves 32, 34 thus define a pedestal base with inclined walls 38 (FIG. 3C) having slots 39 formed therein for receiving hinges 42 and 61 FIG. 3D) for pivotally coupling the lower end of sliding tray assemblies 40 and 60 to base 30 to which housing 20 is secured by suitable fastening means, such as self-threading screws or the like. Base 30 is also made of a suitable polymeric material, such as ABS. In some embodiments, the floor 31 of housing 20 may integrally define the base 30 as a single unit.

Housing halves 32, 34 are inter-fit together along a mating edges 27 and fastened together with suitable fasteners, such as self-tapping screws or the like. With such construction, housing half 34 overlaps housing half 32 slightly to provide an integral open housing to which the tray assemblies 40 and 60 are attached as now described.

Each of the tray assemblies 40, 60 are substantially identical in their coupling to base 30 and their relationship to housing 20. Each include identical tray latch assemblies 100 which are spring-loaded and actuated to lock the sliding tray assemblies in either a closed position, as shown in FIG. 1, or an open position, as shown in FIG. 2. A description of sliding tray assembly 40 and its detailed construction is now presented with it being understood that sliding tray assembly 60 and its latch assembly 100 is substantially identical and can best be understood by reference to the details in FIGS. 3A and 3B now described.

Tray assembly 40 comprises a generally vertically extending panel 44 which has a lower wall 46 secured to tang 41 on hinge 42 (FIG. 3D) with tang 43 of hinge 42 secured to base 30. Tang 41 extends through slot 39 in walls 38 (FIG. 3C) to allow the panel 44 to pivot between the positions shown in FIGS. 1 and 2. Panel 44 is pivotally mounted at its upper end by means of a pair of tangs 48 on either upper end which engage mating tangs 58 of sliding plate 50 by means of pivot pins 49 extending through apertures 47 in tangs 48 and apertures 57 in tangs 58. This allows the panel 44 to pivot with respect to sliding plate 50. The coupling of sliding plate 50 to housing 20 is described later in detail below with reference to FIGS. 5–8.

Panel 44 includes an open central area 45 for pivotally receiving a storage bin 70 with a cover 72, with bin 70 and cover 72 being removably and pivotally mounted within recess 45 to define a trash receptacle or additional storage for the sliding tray assembly 40. A spring-loaded catch 74 is mounted to bin 70 to engage the upper wall 45' of panel 44 to hold the bin 70 in a closed position as seen in FIGS. 1 and 2. Panel 44, storage bin 70 and cover 72 can be integrally molded of a suitable polymeric material, such as ABS or the like, and the elements, such as cover 72, mounted to bin 70 by suitable fasteners, ultrasonic welding or the like.

Tray assemblies 40, 60 are covers for the storage compartment 22 but preferably each include a storage tray 120 (FIG. 3A) which includes side walls 122, front wall 124, and a rear wall 126 having a slot 128 formed therein for receiving a control actuator 102 of latch assembly 100 as described in greater detail below. Tray 120 includes an open storage area 125 which may removably receive a cup holder unit 130 which is defined by a rectangular molded polymeric structure which fits within the opening 125 at the forward end, as seen in FIGS. 1 and 2, and which includes a pair of cup holder recesses 132 for providing storage for drinking cups, soda cans and the like. The floor 127 of recess 125 may be covered by a mat 129 made of sanoprene to provide a removable member for cleaning storage bin 125 of tray 120 if necessary. Tray 120 is mounted to sliding plate 50 by suitable fastening means extending through apertures 51 in the floor 52 of sliding plate 50. Sliding plate 50 includes rear, downwardly extending tangs 59 at rear opposite corners with slots 55 for receiving therein a vertically movable latch bar 104 which extends through slots 55 and is vertically movable therein to selectively interengage notches 29 in rail 23 as described below in connection with the latch assemblies 100.

A sliding rod 62 for each of the tray assemblies 40, 60 fit within an aperture 53 with downwardly depending tangs 59 and ride within the groove 25 between rails 21 and 23, as best seen in FIGS. 5–8 to provide guided support for the tray assemblies as they slide between a closed position (shown in FIG. 1) to an open position (shown in FIG. 2). Thus, each of the tray assemblies, which are of substantially identical construction, are pivoted at their lower wall 46 by a hinge (either 42 or 62) to pivot outwardly while the pivot connection between tangs 48 and 58 allow the upper end 45' to pivot with respect to sliding plate 55 and tray 120 mounted thereto. The inner facing ends of tray assemblies 40 and 60 are guideably supported by the guide rods 62 which extends in the slot 25 between rails 21 and 23 to control the sliding movement of the trays when they are moved from the position shown in FIG. 1 to that shown in FIG. 2. The latch assembly 100 employed for each of the tray assemblies 40, 60 provides a spring-loaded latch to positively lock the trays in either an open or closed position and is now described in connection with FIGS. 3A and 5–8.

Each of the latch assemblies include a latch receiver 140 integrally molded of a suitable polymeric material, such as ABS, for example, and includes a generally vertically extending wall 142 and a socket 145 defined by edges 144 and 146 extending from one side of wall 142 for receiving tangs 154, 156 of pushbutton 102 to captively and slidably mount pushbutton actuator 102 to receiver 140. Wall 142 includes an outwardly extending flange 148 which allows the mounting of receiver 140 to the floor 52 of sliding plate 50 by means of fasteners extending through apertures 147 in flange 148 with the lower end of wall 142 extending through mounting slots 54 in floor 52 of sliding plate 50. The latch bar 104 is captively held to pushbutton actuator 102 within receiving slots 106 with the bar 104 being urged in an upwardly latching position by means of compression springs 110 which extend between ledges 112 at the bottom of slots defined by edges 144 and 146 of receiver 140 and the tangs 154 and 156 of pushbutton actuator 102 to urge the pushbutton actuator 102 into a raised position, as seen in FIGS. 5 and 6. This urges latch bar 104 (which has a length which extends between the inner sides of sides 36 of housing halves 32 and 34 between rails 21 and 23) to selectively engage slots 29 in the upper rail 23 when trays 40 and 60 are in their latched closed or latched open positions. Additional notches 29 can be provided for latching the trays in intermediate positions if desired.

The vertical wall 142 of receiver 140 includes a pair of integrally formed resilient tabs 149 which engage top surface of horizontal wall 108 once pushbutton actuator 102 is inserted within the slot 145 defined by edges 144 and 146 and project inwardly to captively hold the pushbutton actuator 102 within receiver 140. Thus, once latch assemblies 100 are preassembled with members 102, 140 and springs 110, the assemblies 100 are secured to the sliding plate 50 for each of the tray assemblies 40 and 60 by inserting latch bars 104 into slots 106 and 55 and guide rods 62 through apertures 52 into track 25 by installing top rail 23 to attach the sliding plate 50 and latch assemblies 100 to housing 20.

The pushbutton actuator 102 includes a top actuator surface 103 which extends through and is generally flush with aperture 128 in tray 120, as best seen in FIGS. 5 and 6, when the actuator bar 104 is in a latched position in one of the notches 29. When the actuator 102 is depressed downwardly as seen in FIGS. 7 and 8, latch bar 104 is depressed downwardly in a direction indicated by arrow A in FIGS. 7 and 8 to release from slots 27 allowing the trays 40 or 60 to be slid from a latched position to the next adjusted position. Aperture 128 defines, as best seen in FIGS. 7 and 8, a finger recess for allowing the operator to easily slide the tray assemblies 40, 60 to an open or closed position.

Base 30 is mounted to latch assembly 80 (FIG. 3D) which, in turn, releasably mounts console 10 to the floor 12 of a vehicle by means of the socket 90 (FIG. 4) mounted permanently in the floor of the vehicle. Socket 90 comprises a molded polymeric member 92 having a pair of semicylindrical sockets 91, 93 therein which each receive locking pins 94 extending across the recesses 91 and 93 and through apertures 97 in side walls thereof for receiving latch bars of latch assembly 80 as described below. A pair of pivoted covers 96, which snap or detent into the closed position, extend over and enclose sockets 91 and 93 when console 10 is not installed to the floor of a vehicle. Covers 96 include pivot pins 95 which extend within apertures in housing 92 and are captively held in position at an opposite end by means of a keeper bar 98 secured to housing 92 by conventional fastening means.

Latch assembly 80 includes a spring-loaded sliding latch plate 82 slidably mounted to a stationary housing 84. Plate 82 includes two pairs of spring-loaded latching dogs 86 and 88 which are pivotally mounted to plate 82 and controlled by latch arm assembly 85, as described in detail in the above-identified patent application Ser. No. 09/222,261, such that latch dogs 86 and 88 selectively extend downwardly and engage pins 94. When latch arm assembly 85 is released, this allows plate 82 under the force of compression spring 81 engaging boss 83 on housing 84 and tab 81' on plate 82 to move latching pate 82 in the direction indicated by arrow B for holding the console 10 to floor 12 of the vehicle. When latch arm assembly 85 and particularly actuator member 85' is depressed, plate 82 slides in a direction opposites arrow B, thereby causing latching dogs 86, 88 with progressive latching angles to release from pins 94, allowing the console to be removed entirely from the vehicle floor. The use of pairs of latching dogs 86 and 88, which include progressively different angles of engagement with pins 94, provides secure locking of the console to the vehicle floor for preventing detachment of the console in the event of a collision.

Thus, the console assembly of the present invention provides the flexibility of allowing a console to be removably mounted to a vehicle floor and provides sliding trays permitting access to a central storage area, which may include a removable bag. The sliding trays 40, 60 may include additional storage features, such as trash receptacles, cup holders, mesh bags, or the like, to provide the vehicle operator and passengers with additional conveniences when traveling in a vehicle. The open sides 37 of the console housing 20 may be selectively enclosed by panels (not shown), if desired, to provide an enclosed storage compartment 22 with the storage container 24 removed therefrom.

It will become apparent to those skilled in the art that these and various other modifications to the preferred embodiment of the invention as described herein can be made without departing from the spirit or scope of the invention as defined by the appended claims.

The invention claimed is:

1. A console for a vehicle comprising:
   a housing defining a storage compartment;
   a panel pivotally coupled to said housing; and
   an articulated cover pivotally coupled to said panel and to said housing and selectively movable from a first position for closing at least a portion of said storage compartment to a second position providing access to said storage compartment.

2. The console as defined in claim 1 wherein said cover includes a storage tray.

3. The console as defined in claim 1 wherein said console further includes a second panel pivotally coupled to said housing at an end opposite said first panel and an articulated second cover pivotally coupled to said second panel and to said housing and selectively movable from a first position for closing at least a portion of said storage compartment to a second position providing access to said storage compartment.

4. A floor console for a vehicle comprising:
   a housing for mounting to a vehicle floor, said housing including an opening communicating with a storage compartment within said housing;
   a pair of panels pivotally mounted at one end to said housing to allow said panels to pivot away from said housing; and
   a cover pivotally coupled to an opposite end of each of said panels and including an end distal from said coupling to said panels which is slidably coupled to said housing for allowing said covers to move between a first position immediately adjacent one another enclosing said opening to a second spaced-apart position permitting access to said storage compartment.

5. The console as defined in claim 4 wherein said cover includes a tray.

6. The console as defined in claim 4 and further including a latch coupled to each of said covers for selectively locking said covers in said first or second position.

7. The console as defined in claim 6 wherein said housing defines a storage compartment and said covers when moved to said second position, provide an access opening for said storage compartment.

8. The console as defined in claim 7 and further including a storage container which can be removably placed within said storage compartment for transportation from the vehicle.

9. The console as defined in claim 8 wherein said side walls of said housing are open.

10. The console as defined in claim 9 wherein said side walls of said housing each include a pair of spaced inwardly facing guide rails and said covers include a guide rod slidably mounted between said guide rails.

11. The console as defined in claim 10 wherein said latch includes a latch bar having opposite ends slidably extending transversely between said guide rails of said housing and wherein at least one of said guide rails includes spaced-apart notches for receiving said latch bar for lockably holding said covers in at least said first and second positions.

12. The console as defined in claim 11 wherein said latch includes a bias spring for urging said latch bar to a locked position in one of said notches.

13. The console as defined in claim 12 wherein said cover includes a tray.

14. The console as defined in claim 13 wherein said tray includes a removable accessory.

15. The console as defined in claim 14 wherein said accessory is a cup holder.

16. The console as defined in claim 14 wherein at least one of said panels includes a storage compartment.

17. A removable console for a vehicle floor comprising:
   a housing including attachment structure for removably mounting said housing to a vehicle floor;
   a panel pivotally mounted at a lower end thereof to said housing to allow said panel to pivot away from said housing; and a storage tray pivotally coupled to an upper end of said panel and including an end distal from said coupling to said panel which is slidably coupled to said housing for allowing said storage tray to move with respect to said housing.

18. The console as defined in claim 17 wherein said console includes a second panel pivotally mounted to said housing at an opposite end of said housing and a second storage tray pivotally coupled to an upper end of said second panel and including an end distal from said coupling to said second panel which is slidably coupled to said housing for allowing said storage tray to move with respect to said housing.

19. The console as defined in claim 18 wherein one of said trays include a removable accessory.

20. The console as defined in claim 19 wherein said accessory is a cup holder.

21. The console as defined in claim 17 and further including a latch coupled to each of said storage trays for selectively locking said covers in said first or second position.

22. The console as defined in claim 21 and further including a storage compartment selectively covered by said storage trays and a storage container which can be removably placed within said storage compartment for transportation from the vehicle.

23. The console as defined in claim 22 wherein said side walls of said housing each include a pair of spaced inwardly facing guide rails and said storage trays include a guide rod slidably mounted between said guide rails.

24. The console as defined in claim 23 wherein said latch includes a latch bar having opposite ends slidably extending transversely between said guide rails of said housing and wherein at least one of said guide rails includes spaced-apart notches for receiving said latch bar for lockably holding said storage trays in at least first and second positions.

25. The console as defined in claim 24 wherein said latch includes a bias spring for urging said latch bar to a locked position in one of said notches.

26. The console as defined in claim 17 wherein at least one of said end walls has a storage compartment.

27. An accessory for a vehicle comprising:
   a housing including side walls and end walls, said housing defining a storage compartment with an access opening through a top thereof;
   a pair of panels pivotally mounted at lower ends thereof to opposite lower ends of said housing to allow said panels to pivot toward and away from said housing; and
   a cover pivotally coupled to an upper end of each of said panels and including an end distal from said coupling to said panels which is slidably coupled to said housing for allowing said covers to move between a first position immediately adjacent one another for enclosing said access opening to a second spaced-apart position exposing said access opening.

28. The accessory as defined in claim 27 and further including a latch for each of said covers for selectively latching said covers in at least a closed position.

* * * * *